US006901645B2

(12) United States Patent
Oliver

(10) Patent No.: US 6,901,645 B2
(45) Date of Patent: Jun. 7, 2005

(54) WHEELED VEHICLE KINGPIN BOLT REMOVING TOOL

(76) Inventor: Joshua Ray Oliver, 4747 N. Carolina St., Space 83, Fresno, CA (US) 93722

( * ) Notice: Subject to any disclaimer, the term of this patent is extended or adjusted under 35 U.S.C. 154(b) by 0 days.

(21) Appl. No.: 10/632,967

(22) Filed: Aug. 4, 2003

(65) Prior Publication Data

US 2005/0028338 A1 Feb. 10, 2005

(51) Int. Cl.[7] .............................. B23P 19/04; B23P 6/00

(52) U.S. Cl. ................................ 29/402.08; 29/402.03; 29/401.1; 29/559

(58) Field of Search ............................ 29/402.08, 401.1, 29/402.03, 402.12, 559, 402.15, 281.1; 269/16, 319, 97, 219, 104, 287, 87.2, 296, 302, 100, 40, 36; 81/6

(56) References Cited

U.S. PATENT DOCUMENTS

| | | | | | |
|---|---|---|---|---|---|
| 128,641 | A | * | 7/1872 | Low | 269/100 |
| 358,885 | A | * | 3/1887 | Rose | 81/6 |
| 504,856 | A | | 9/1893 | Aichner | |
| 744,559 | A | * | 11/1903 | Kendrick | 409/225 |
| 1,404,075 | A | | 1/1922 | Van Horn | |
| 1,689,797 | A | | 10/1928 | Myers | |
| 2,031,159 | A | * | 2/1936 | Griffith | 269/104 |
| 2,162,611 | A | | 6/1939 | Dreher | |
| 2,422,773 | A | | 6/1947 | Colwill | |
| 3,036,828 | A | | 5/1962 | Van Fleet | |
| 3,051,473 | A | | 8/1962 | Juhase | |
| 3,432,160 | A | | 3/1969 | Wovcha | |
| 3,861,664 | A | | 1/1975 | Durkee | |
| 3,963,234 | A | | 6/1976 | Bejtlich | |
| 4,018,430 | A | | 4/1977 | Ursich | |
| 4,116,425 | A | | 9/1978 | Pesola | |
| 4,241,906 | A | * | 12/1980 | Cole | 269/43 |
| 4,507,631 | A | * | 3/1985 | Louet et al. | 333/222 |
| 4,847,119 | A | * | 7/1989 | Chin et al. | 427/282 |
| 5,094,038 | A | | 3/1992 | Maruyama | |
| 5,497,982 | A | | 3/1996 | Stoltz | |
| 5,564,681 | A | | 10/1996 | Glass | |
| 6,467,782 | B1 | | 10/2002 | Smith | |

* cited by examiner

*Primary Examiner*—Marc Jimenez
(74) *Attorney, Agent, or Firm*—Kramer & Amado, P.C.

(57) ABSTRACT

A wheeled vehicle kingpin bolt-replacement tool is disclosed manufactured from a rigid material, which facilitates bolt removal. The tool allows a baseplate to be inserted along two perpendicular intersection channels. A first channel engages the baseplate to prevent movement upon application of force while the second channel allows sufficient clearance for the kingpin bolt that is bound to the baseplate to be forcefully struck and removed from the base plate. A method is also disclosed for using the tool of the present invention to remove a kingpin bolt from a baseplate upon application of force.

4 Claims, 3 Drawing Sheets

WHEELED VEHICLE KINGPIN BOLT REMOVING TOOL

BACKGROUND OF THE INVENTION

1. Field of the Invention

This invention relates generally to a skateboard kingpin replacement tool. Specifically, the tool is in the shape of a holder for facilitating the removal and replacement of a kingpin bolt from a wheeled vehicle truck baseplate used in skateboards and other wheeled vehicles.

2. Description of Related Art

Skateboarding is a sport with growing worldwide popularity commonly practiced on surfaces such as streets, sidewalks and other hard surfaces including pools, rails and other riding tools and obstacles that may be found in a skateboarding terrain park. One common feature of the surfaces where skateboarding, and other wheeled vehicle sports are practiced, is their construction. These commonly consist of very hard surfaces such as cement, metal, plastic or wood. Based on the materials used for these surfaces, significant wear is experienced by the skateboard. This is especially the case with the wheels and the machinery used to connect the wheels to the riding surface of the vehicle, commonly called a deck. Due to the construction of wheeled vehicle trucks, the wheel-mounting axle is joined to a truck mounting plate, or baseplate by way of a bolt, commonly known in the art as a kingpin. The baseplate is then mounted to the deck and facilitates control of the wheeled vehicle.

Due to the varied hard surfaces encountered during skateboarding, damage to the skateboard and its accessories is fairly common. When such damage occurs, a person may easily replace the skateboard deck, wheels, wheel bearings and bushings. In contrast to the ease of skateboard deck and accessory replacement, the kingpin bolt, which is mounted through the baseplate and allows attachment of the wheel-mounting axle, is often difficult to replace. This difficulty arises from the practice by manufacturers of either tightly inserting the kingpin bolt into the base plate, or even more problematic, creating a joining of the kingpin to the base plate with an adhesive or spot-weld. When a kingpin is damaged or broken due to numerous occurrences, removal is accomplished through application of force to the broken end of the kingpin bolt from the threaded end. Replacement of the kingpin bolt is then accomplished through placement of a new kingpin bolt into the baseplate. Such replacement may also require the use of force and will vary on the size of the kingpin bolt head, the size of the cavity of the baseplate, as well as residual welding material or other foreign material that may be found inside.

The kingpin bolt, being threaded from the wheeled-vehicle mounting end of the baseplate requires that the edges of the base plate have a firm support while the central part of the base plate is exposed to a clearance of a length at least as long as the kingpin bolt. Such a specific situation is not commonly found and users will often dispose of the entire truck and buy a new device. This proves costly to the user while allowing the manufacturers to profit from the difficult kingpin bolt attachment practice. If removal is attempted, the user is forced into using a method of replacing the kingpin bolt by banging the threaded end of the kingpin bolt while supporting the base plate against a sidewalk or other hard surface.

When this method is attempted, it can easily result in damage to the baseplate through warping or cracking, again requiring the purchase of a new truck and additional cost to the user, even though the only damaged piece of the entire truck assembly is the kingpin bolt. Even more dangerous is the potential damage to the person attempting the removal. Since significant force needs to be applied and a firm surface is not readily available, personal damage, such as scratches, ripped fingernails, broken fingers and damage to the eyes is a possible outcome of such an attempt.

Due to the difficulties and potential injury encountered in kingpin bolt replacement, there exists a need for an apparatus for removing and replacing a kingpin bolt from a truck baseplate easily and without subjecting the user to potential damage to himself or the baseplate of his skateboard. There also exists a need to provide a skateboard truck holding tool that can be easily used without risk of injury and is inexpensive to manufacture. A method of using such a tool is also required to allow for removal of the kingpin bolt easily and without injury to the user.

The features and advantages of the disclosed product and method are illustrative of those that can be achieved by the present invention and are not intended to be exhaustive or limiting of the possible advantages which can be realized. Thus, the advantages of the present invention will be apparent from the description herein or can be learned from practicing the invention, both as embodied herein, or as modified in view of any variation, which may be apparent to those skilled in the art. Accordingly, the present invention resides in the novel methods, arrangements, combinations and improvements herein shown and described.

SUMMARY OF THE INVENTION

In light of the present need for a kingpin bolt replacement tool as well a method of replacing kingpin bolts, a brief summary of the present invention is presented. A wheeled vehicle truck engaging tool is shown consisting of a rigid device having two perpendicular intersecting channels formed on one end. The two channels have a depth extending towards a second end. The first channel is adapted to receive a wheeled vehicle truck baseplate. The second channel is adapted to receive a kingpin bolt mounted unto the truck baseplate and has an opening on at least one end of the channel extending along a predetermined depth of the channel. A method is also shown for inserting a kingpin bolt mounted unto a truck baseplate, whereby the baseplate is secured inside the tool. Force is then applied in a downward fashion to the kingpin bolt to remove the bolt from the baseplate. The baseplate can then be inserted into the tool in the upside down direction to secure the baseplate inside the tool. A new kingpin bolt can then be inserted into the baseplate and the head of the kingpin bolt secured into the receiving cavity.

Some simplifications and omission may be made in the following summary, which is intended to highlight and introduce some aspects of the present invention, but not to limit its scope. Detailed descriptions of a preferred exemplary embodiment adequate to allow those of ordinary skill in the art to make and use the invention concepts will follow in later sections.

BRIEF DESCRIPTION OF THE DRAWINGS

In order to better understand the present invention, reference is made to the accompanying drawings, wherein.

DETAILED DESCRIPTION OF THE PREFERRED EMBODIMENTS OF THE INVENTION

Figure 1:
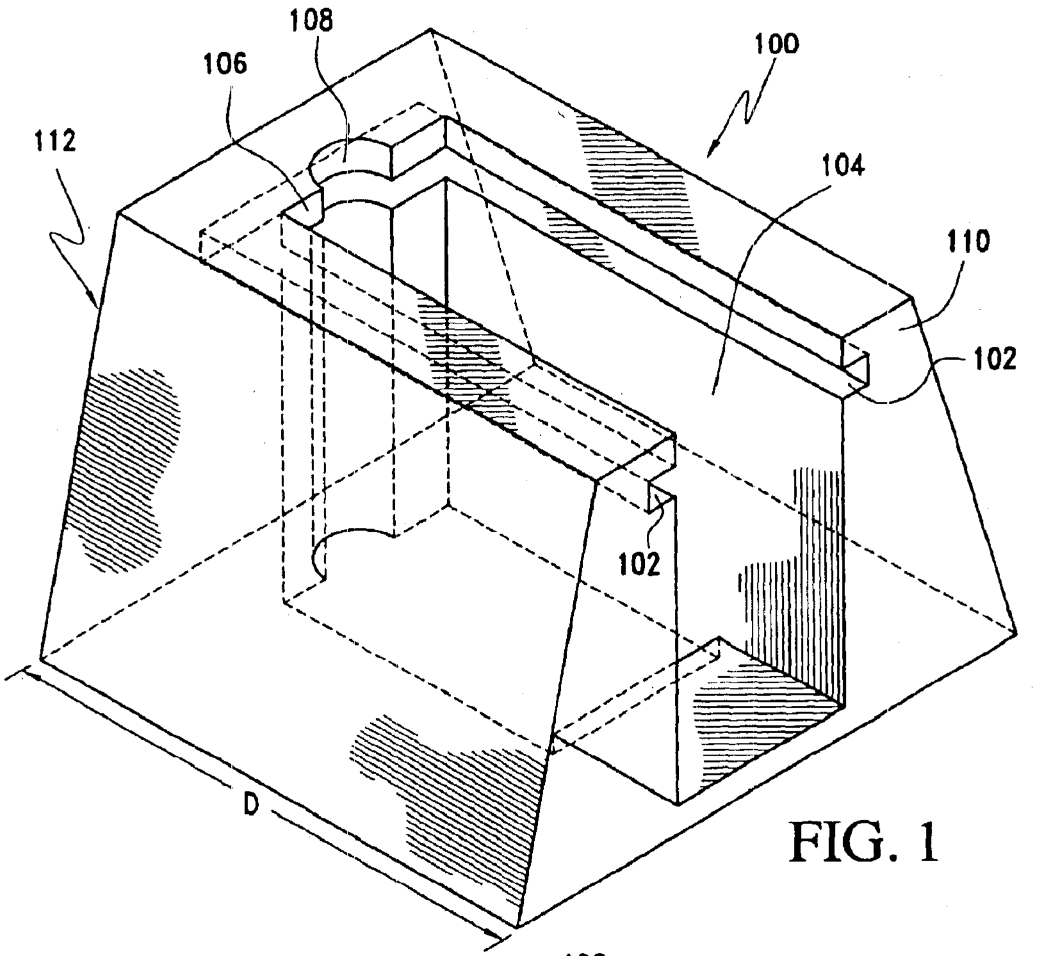
FIG. 1 shows a perspective view of the bolt-replacement tool.

Referring now to the drawings, in which like numerals refer to like components or steps, there are disclosed broad aspects of the preferred embodiments of the present invention. FIG. 1 shows a perspective view of one embodiment of the kingpin bolt replacement tool. The tool 100 is manufactured from a rigid device, such as plastic, wood, metal or other hard material capable of withstanding blunt forces, and includes two perpendicular intersecting channels formed on one end and having a predetermined depth D extending towards a second end.

When viewing the tool 100 as it rests on a flat surface, the first channel 102 is open horizontally and extends from the front, designated as the first end 110, towards the back of the tool, designated as the second end 112 along depth D. The second channel 104 is perpendicular and crosses the first channel 102 vertically, and also extends from the first end 110 towards the second end 112 along depth D. The depth of either channel may vary but must be sufficient to allow a baseplate to be inserted. The bolt-replacement tool of FIG. 1 also shows a stopping end 106 to second channel 104. This stopping end may also be formed to stop first channel 102, or either channel independently based on the chosen construction. The stopping end 106 will function to restrain the truck assembly, including the baseplate and the kingpin bolt, during operation of the tool 100 to prevent it from moving. The stopping end 106 also features a bolt receiving recess 108.

Figure 2:
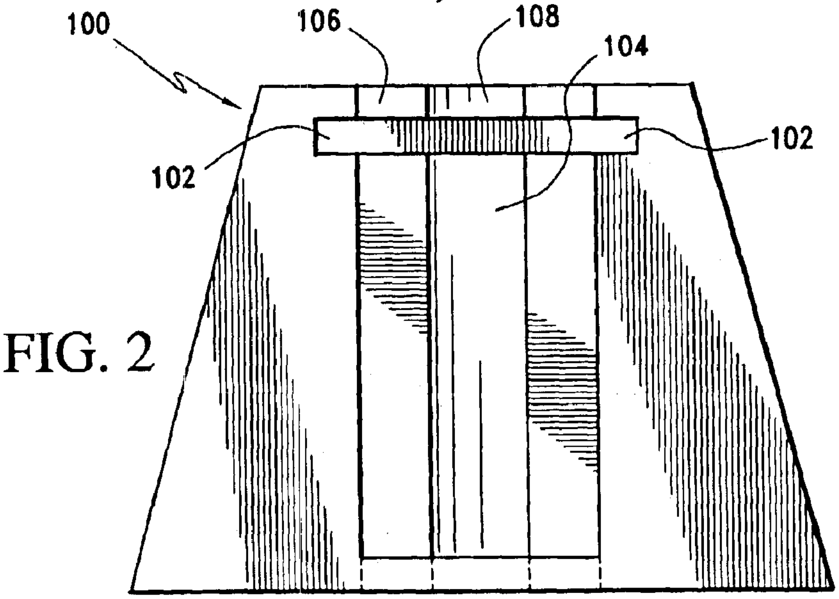
FIG. 2 shows a front view of the bolt-replacement tool.

FIG. 2 shows a front view of one embodiment of the bolt-replacement tool 100 with the first channel 102 intersecting the second channel 104. The stopping end 106 is also shown at the end of the intersecting channels in conjunction with the bolt receiving recess 108.

Figure 3:
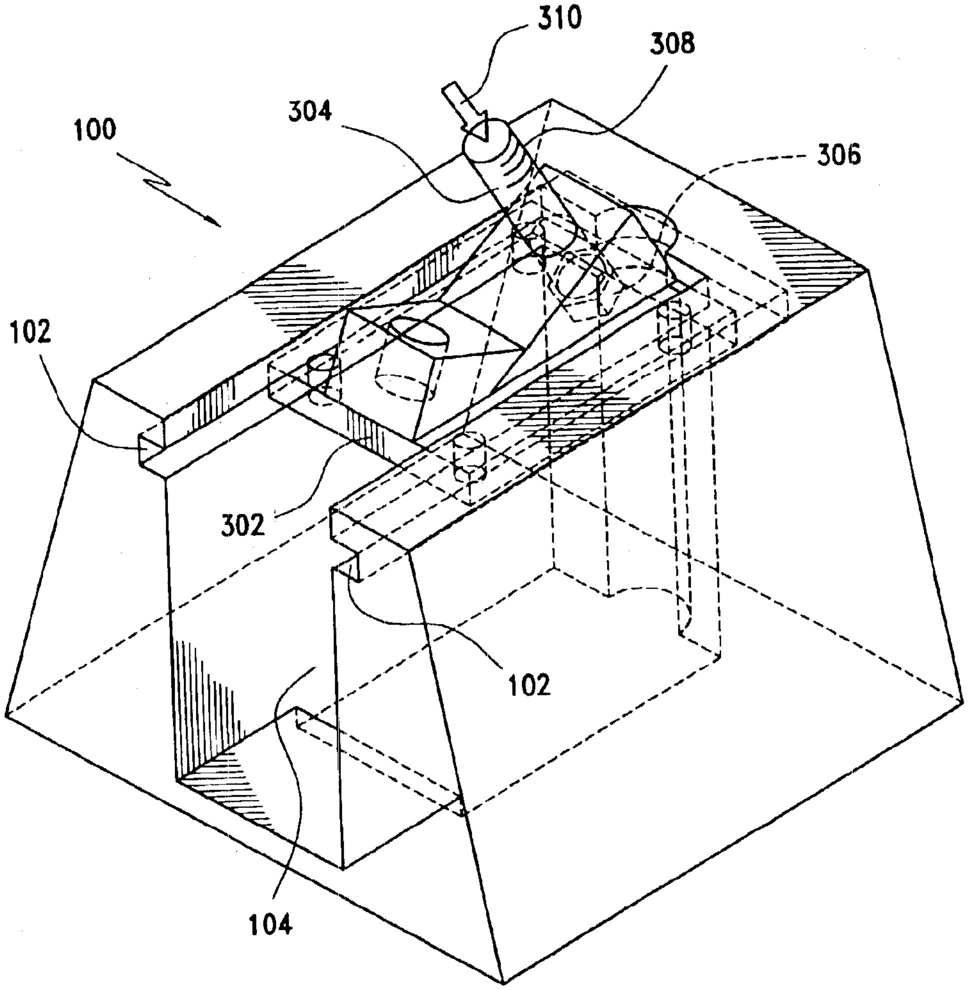
FIG. 3 shows a perspective view of the tool with a base plate containing a broken kingpin bolt and the direction of downward force applied.

FIG. 3 shows a perspective view of the tool 100 with a base plate 302 inserted into the tool 100. The ends of the baseplate 302 rest inside the first channel 102. The kingpin bolt 304 is shown inserted into the baseplate 302, with the kingpin bolt head 306 inside the baseplate 302 and the threaded end 308 protruding across the baseplate 302. The kingpin bolt 304 therefore is positioned along a length of the second channel 104 while the baseplate 302 is secured along a length of the first channel 102.

Figure 4:
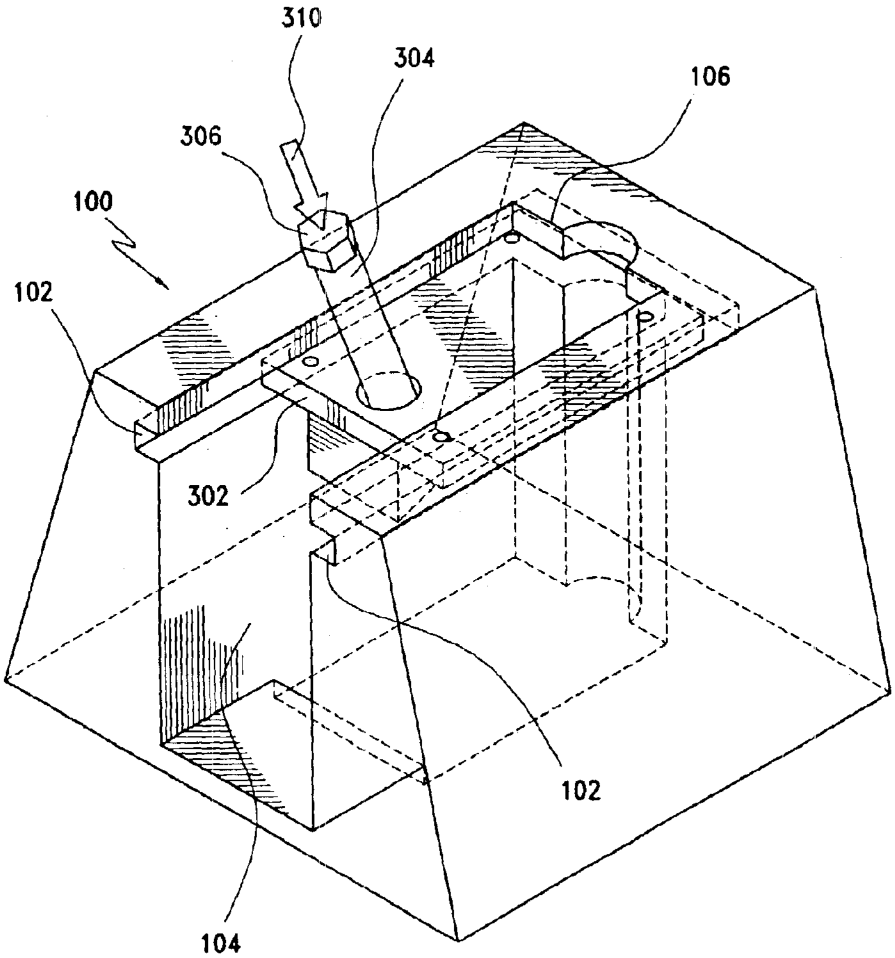
FIG. 4 shows a perspective view of the tool with a base plate containing a replacement kingpin bolt being inserted and the direction of downward force applied.

Similar to FIG. 3, FIG. 4 shows a perspective view of the tool 100 with a baseplate 302 inserted into the tool 100 but during replacement of the kingpin bolt. The base plate is flipped upside down so that a new kingpin bolt can be inserted through application of force.

In one method of using the present invention, a baseplate 302, having a broken or damaged kingpin bolt 304 inserted therein, is placed into the tool 100 by sliding the baseplate 302 into channel 102, with the threaded end 308 facing away from the tool 100 and protruding from the top end of channel 104. The baseplate 302 is pushed into the channel 102 until it reaches the stopping end 106. Due to the standard manufacture of skateboard trucks, the kingpin bolt 304 enters the baseplate 302 at an angle, usually between 5 and 45 degrees from vertical. Due to this angle, when the baseplate 302, including the broken or damaged kingpin bolt 304, is inserted into the tool 100, it is preferable that the threaded end 308 be directed towards the first end 110 of the tool. By using such orientation, a force may then be applied to the threaded end 308 at the same angle of orientation of the kingpin bolt 304. Since this application of force at such an angle would create movement of the entire baseplate 302, the stopping end 106 will allow the tool 100 to absorb the force without movement of the baseplate 302. By directing force against the threaded end 308, the entire kingpin bolt 304 is dislodged from the baseplate 302 and will fall into the bottom of channel 104. Due to the possibility of inserting kingpin bolts from either direction of the baseplate, the operation of the present invention may be inverted to allow for removal of a kingpin bolt from either direction of insertion into the baseplate.

In an embodiment including a bolt receiving recess 108, when the kingpin bolt 304 is dislodged from the baseplate 302 at an angle, the bolt receiving recess 108 can accommodate such dislodgement. The bolt receiving recess 108 may extend from the top of the tool 100 towards the bottom, or may only extend below the intersection of the two channels at the stopping end 106 of the tool 100. In the case of a tool 100 not having a bottom end to channel 104, it may be placed on a surface where the kingpin bolt 304 may fall past the tool and onto the floor or into a receiving container. Additional embodiments may be constructed where the tool is not unitary but sectional. Such embodiments may be more easily transported in a smaller package and assembled on site through attachment of the independent sections to create the two intersecting channels 102 and 104.

In one method of the kingpin bolt replacement operation, the baseplate is flipped upside down and the baseplate 302 is inserted in the opposite direction, so that the baseplate 302 end that entered the channel 102 first is now the closest to the entrance of the channel 102. Since the angle of entry of the kingpin bolt is commonly from 5 and 45 degrees from vertical, this inversion of the baseplate 302 will allow the application of force 310 to the replacement kingpin bolt in a secure manner. As can be seen in FIG. 4, the application of force will force the baseplate 302 into the channel 102 and will secure its movement by way of the stopping end 106. As previously described, due to the possibility of inserting kingpin bolts from either direction of the baseplate, the operation of the present invention may be inverted to allow for removal of a kingpin bolt from either direction of insertion into the baseplate.

Although the present invention has been described in detail with particular reference to preferred embodiments thereof, it should be understood that the invention is capable of other different embodiments, and its details are capable of modifications in various obvious respects. As is readily apparent to those skilled in the art, variations and modifications can be affected while remaining within the spirit and scope of the invention. Accordingly, the foregoing disclosure, description and figures are for illustrative purposes only, and do not in any way limit the invention, which is defined only by the claims.

What is claimed is:

1. A method of replacing a kingpin bolt from a wheeled vehicle baseplate, comprising the steps of:

providing a rigid device having two perpendicular intersecting channels formed on a first end and having a depth extending towards an opposite second end;

the first channel adapted to receive a truck baseplate;

the second channel adapted to receive a kingpin mounted onto the truck baseplate and having an opening on at least one end of the channel extending along a predetermined depth of the channel;

inserting a baseplate having a kingpin bolt inserted therein into the device with the threaded end of the kingpin facing the opening along the second channel; and applying force to the threaded end of the kingpin until removal from the baseplate.

2. The method of claim 1, wherein the force is applied using a hammer.

3. The method of claim 1, further including the steps of removing the baseplate;

inverting the baseplate upside down and reinserting into the tool;

inserting a replacement kingpin bolt into the baseplate; and applying force until the kingpin is inserted into the baseplate.

4. The method of claim 3, wherein the force is applied using a hammer.

* * * * *